US00RE48506E

(19) United States
(12) Reissued Patent
McClellan

(10) Patent Number: US RE48,506 E
(45) Date of Reissued Patent: *Apr. 6, 2021

(54) METHOD AND SYSTEM FOR A MULTI-RATE GIGABIT MEDIA INDEPENDENT INTERFACE

(71) Applicant: MARVELL INTERNATIONAL LTD., Hamilton (BM)

(72) Inventor: Brett A. McClellan, Laguna Hills, CA (US)

(73) Assignee: Marvell Asia Pte, Ltd., Singapore (SG)

( * ) Notice: This patent is subject to a terminal disclaimer.

(21) Appl. No.: 15/682,324

(22) Filed: Aug. 21, 2017

Related U.S. Patent Documents

Reissue of:
(64) Patent No.: 7,720,068
Issued: May 18, 2010
Appl. No.: 11/894,990
Filed: Aug. 21, 2007

U.S. Applications:
(63) Continuation of application No. 13/474,515, filed on May 17, 2012, now Pat. No. Re. 46,523, which is an application for the reissue of Pat. No. 7,720,068.

(60) Provisional application No. 60/839,986, filed on Aug. 23, 2006.

(51) Int. Cl.
*H04L 12/801* (2013.01)
*H04L 27/00* (2006.01)
*H04L 12/815* (2013.01)

(52) U.S. Cl.
CPC ..... *H04L 47/10* (2013.01); *H04L 27/0008* (2013.01); *H04L 47/22* (2013.01); *H04L 2212/00* (2013.01)

(58) Field of Classification Search
CPC ..... H04L 47/10; H04L 47/22; H04L 27/0008; H04L 2212/00
See application file for complete search history.

(56) References Cited

U.S. PATENT DOCUMENTS 4,359,778 A 11/1982 Lee
4,583,235 A 4/1986 Dömer et al.
4,878,232 A 10/1989 Fisher
4,956,838 A 9/1990 Gilloire et al.
(Continued)

OTHER PUBLICATIONS

"Convolution by DFT," http://www.gresilog.com/english/excommen/doc/convtd.htm, printed Jul. 2002, pp. 1-3.
(Continued)

*Primary Examiner* — David E England

(57) ABSTRACT

Disclosed is a [UGMII] system to interface multirate devices including 10 gigabit per second data exchange rates. Mode selection is enabled to provide for automatic detection and adaptation to any transmit rate including 10M, 100M, 1G, and 10G. Mode selection comprises the negotiation between the UGMII extension sublayers located at the MAC and PHY to select between one of several operational modes including: XGIVIII communication, GIYIII encapsulation, Clause 22 MDIO register management and Clause 45 MDIO register management. Selection of UGMII and XGMII operating modes are negotiated between the MAC and PHY using ordered sets to announce and acknowledgement a mode change. In one embodiment 802.3 Clause 46 defined ordered sets are utilized.

53 Claims, 6 Drawing Sheets

(56) References Cited

U.S. PATENT DOCUMENTS 5,150,381 A 9/1992 Forney et al.
5,222,084 A 6/1993 Takahashi
5,249,200 A 9/1993 Chen et al.
5,293,402 A 3/1994 Crespo et al.
5,297,170 A 3/1994 Eyuboglu et al.
5,301,209 A 4/1994 Wei
5,305,307 A 4/1994 Chu
5,307,405 A 4/1994 Sih
5,388,124 A 2/1995 Laroia et al.
5,633,863 A 5/1997 Gysel et al.
5,646,958 A 7/1997 Tsujimoto
5,822,371 A 10/1998 Goldstein et al.
5,856,970 A 1/1999 Gee et al.
5,862,179 A 1/1999 Goldstein et al.
5,896,452 A 4/1999 Yip et al.
5,909,466 A 6/1999 Labat et al.
6,081,502 A 6/2000 Paneth et al.
6,088,827 A 7/2000 Rao
6,147,979 A 11/2000 Michel et al.
6,160,790 A 12/2000 Bremer
6,167,082 A 12/2000 Ling et al.
6,201,831 B1 3/2001 Agazzi et al.
6,226,332 B1 5/2001 Agazzi et al.
6,249,544 B1 6/2001 Azazzi et al.
6,252,904 B1 6/2001 Agazzi et al.
6,253,345 B1 6/2001 Agazzi et al.
6,259,729 B1 7/2001 Seki
6,272,173 B1 8/2001 Hatamian
6,285,653 B1 9/2001 Koeman et al.
6,297,647 B2 10/2001 Kirk et al.
6,304,598 B1 10/2001 Agazzi et al.
6,351,531 B1 2/2002 Tahernezhaadi et al.
6,356,555 B1 3/2002 Rakib et al.
6,359,893 B1 * 3/2002 Mills ..... 370/402
6,385,208 B1 * 5/2002 Findlater ..... H04L 7/0008 370/401
6,433,558 B1 8/2002 Sciacero et al.
6,463,041 B1 10/2002 Agazzi
6,480,477 B1 * 11/2002 Treadaway et al. ..... 370/314
6,480,532 B1 11/2002 Vareljian
6,493,448 B1 12/2002 Mann et al.
6,584,160 B1 6/2003 Amrany et al.
6,598,203 B1 7/2003 Tang
6,618,480 B1 9/2003 Polley et al.
6,665,402 B1 12/2003 Yue et al.
6,751,255 B1 6/2004 Reuven et al.
6,813,311 B1 11/2004 Pal et al.
6,823,483 B1 11/2004 Creigh
6,826,226 B1 11/2004 Sahlin et al.
6,862,326 B1 3/2005 Eran et al.
6,956,847 B2 * 10/2005 Heston et al. ..... 370/353
6,961,373 B2 11/2005 Jones
7,031,341 B2 * 4/2006 Yu ..... 370/469
7,065,167 B2 6/2006 McClellan ..... H04L 1/006 370/533
7,203,459 B2 * 4/2007 Goldstein ..... H04L 1/0003 375/221
7,230,957 B2 6/2007 Kang et al.
7,260,120 B2 8/2007 Kang et al.
7,286,622 B2 10/2007 Sefidvash et al.
7,305,047 B1 12/2007 Turner
7,343,425 B1 * 3/2008 Lo ..... H04L 49/3054 370/257
7,356,047 B1 * 4/2008 Mahalawat ..... H04J 3/0688 370/395.5
7,376,146 B2 5/2008 Beverly et al.
7,593,416 B1 9/2009 Lo
7,599,391 B1 10/2009 Lo
7,606,945 B2 10/2009 Tatapudi et al.
7,650,077 B2 * 1/2010 Yu ..... H04B 10/40 398/136
7,664,134 B2 * 2/2010 Caldwell ..... H04L 12/42 370/426
7,668,194 B2 * 2/2010 Chang ..... H04W 88/06 370/465
7,720,068 B2 * 5/2010 McClellan ..... H04L 27/0008 370/391
7,751,442 B2 7/2010 Chang et al.
7,760,750 B1 7/2010 Lo
8,018,924 B1 9/2011 Medina et al.
8,259,748 B2 * 9/2012 Barrass ..... H04L 47/10 370/463
8,320,400 B1 11/2012 Lo
8,325,716 B2 * 12/2012 Ni ..... H04L 12/5601 370/389
8,565,261 B1 10/2013 Lo
8,619,571 B1 12/2013 Sutardja et al.
8,787,402 B2 7/2014 Barrass
8,873,579 B1 * 10/2014 Lo ..... H04L 25/06 370/465
8,885,664 B1 * 11/2014 Lo ..... H04L 1/00 370/465
RE46,523 E * 8/2017 McClellan
2001/0036160 A1 11/2001 Curran et al.
2002/0067824 A1 6/2002 Wang
2002/0106016 A1 8/2002 Egelmeers et al.
2002/0176492 A1 11/2002 Zangi et al.
2002/0191552 A1 12/2002 Watkinson
2003/0067888 A1 4/2003 Bina et al.
2003/0076832 A1 * 4/2003 Ni ..... H04L 47/627 370/395.1
2003/0108092 A1 6/2003 Gorecki et al.
2003/0142659 A1 7/2003 Lin et al.
2003/0179710 A1 * 9/2003 Huff ..... H04L 12/40136 370/248
2003/0214979 A1 11/2003 Kang et al.
2004/0001540 A1 1/2004 Jones
2004/0022311 A1 2/2004 Zerbe et al.
2004/0028156 A1 2/2004 Sefidvash et al.
2004/0090995 A1 5/2004 Kang et al.
2004/0125487 A9 7/2004 Sternad et al.
2004/0202198 A1 * 10/2004 Walker ..... H04J 3/1658 370/474
2005/0063310 A1 * 3/2005 Caldwell ..... H04L 43/50 370/241
2005/0063413 A1 3/2005 Caldwell et al.
2005/0196119 A1 9/2005 Popovic et al.
2006/0153238 A1 * 7/2006 Bar-On ..... H04L 12/40 370/473
2007/0116023 A1 5/2007 Tatapudi et al.
2007/0153781 A1 7/2007 Tatapudi et al.
2007/0174434 A1 7/2007 Tatapudi et al.
2007/0182489 A1 8/2007 Fujimori et al.
2007/0258551 A1 11/2007 Sefidvash et al.
2009/0154473 A1 6/2009 Diab et al.

OTHER PUBLICATIONS

Agazzi et al., "10Gb/s PMD Using PAM-5 Trellis Coded Modulation," Broadcom Corp., Mar. 2000, 38 pages.
Mlinarsky, "Gigabit Ethernet over Cateqorv 5", Scope Communications, Inc., Jun. 1998, 12 pages.
Sellars et al., "Stabilized Precoder for Indoor Radio Communications", IEEE Communications Letters, vol. 4, No. 10, Oct. 2000, pp. 315-317.
Crawford, "Adaptive Filters," http://www.spd.eee.strath.ac.uk/~david/adapt_filt/adapt_filt.html, (1996), pp. 1-5.
Johns et al., "Integrated Circuits for Data Transmission Over Twisted-Pair Channels," IEEE J. of Solid-State Circuits, vol. 32, No. 3, Mar. 1997, pp. 398-406.
Johns, "Equalization," University of Toronto, 1997, 35 pages.
Smalley, "Equalization Concepts: A Tutorial," Texas Instruments, Oct. 1994, pp. 1-27.
Wu et al., "FIR Filter Design via Spectral Factorization and Convex Optimization," to appear as Chapter 1 of Applied Computational Control, Signal and Communications, Biswa Datta Editor, Birkhausesr, 1977, pp. 1-33.

(56) References Cited

OTHER PUBLICATIONS

Fleming, "A Tutorial on Convolutional Coding with Viterbi Decoding," Spectrum Applications, Nov. 2011, pp. 1-6.
"FIR FAQ—Part 2: Properties," Iowegian International Corp., 1999, pp. 1-4.
IEEE Std. 802.3ab-1999—Supplement to 802.3: CSMA/CD, The Institute for Electrical and Electronics Engineers, Inc., 1999, pp. 6-14 and 18-44.
"Definition of Minimum Phase," Center for Computer Research in Music and Acoustices (CCRMA), Stanford University, Aug. 2004, 3 pages.
"Producing a Counter EMF," http://www.tpub.com/neets/book2/5e.htm, printed Sep. 2002, 3 pages.
"Electric Machinery: Chap. 2 Transformers—Dot Convention to Denote the Polarity of a Transformer", http://pemclab.cn.netu.edu.tw/W3elemac/W3slide/ch2.xformer/sld009.htm, 3 pages (Sep. 18, 1995).
"Transformer Polarity", Kilowatt Classroom, LLC, 2002, 3 pages.
"Design of H.F. Wideband Power Transformers; Part II—EC07213," Philips Semiconductors, Mar. 23, 1998, pp. 1-10.
"Use of Ferrites in Broadband Transformers", Fair-Rite Products, Corp., pp. 170-173 (date unknown).
Chen et al., "Current Mirror Circuit with Accurate Mirror Gain for Low 3β Transistors," Proc. of 2001 IEEE Intl Symposium on Circuits and Systems (ISCAS 2001), May 2001, 4 pages.
Herkersdorf et al., "A Scalable SDH/SONET Framer Architecture for Datacom and Telco Applications," Proc. of 2000 Int'l Zurich Seminar on Broadband Comm., 2000, 8 pages.
DiMinico et al., "Development of Equal Level Far-End Crosstalk (ELFEXT) and Return Loss Specifications for Gigabit Ethernet Operation on Category 5 Copper Cabling," Int'l Wire & Cable Symposium Proceedings, 1998, 10 pages.
Pedro Silva, et al., "Precoder Circuit for Channels with Multipath Dispersion", Telecommunications Institute, Department of Electronics and Telecommunications Engineering, The University of Aveiro—University Campus, Portugal, 4 pages (date unknown).
"Tutorial: Adaptive filter, acoustic echo canceller and its low power implementation", Freehand Communication AB, 2006, 6 pages.
Wu et al., "FIR Filter Design via Semidefinite Programming and Spectral Factorization," Proc. of the 35th IEEE Conf. on Decision and Control, 1996, 6 pages.
Ježk at al., "New Algorithm for Spectral Factorization and its Practical Application," 2001 European Control Conference (ECC), Sep. 2001, pp. 1-6.
"ADSL Tutorial", DSL Form, 2001, pp. 1-3.
"Introduction to DSP," Bores Signal Processing, 2000, pp. 1-2.
"QAM_VR—QAM Demodulator with Variable Rate," Sci-worx GmbH, pp. 1-2 (date unknown).
"Description of Algorithms (Part 1)," from Tutorial on Convolutional Coding with Viterbi Decoding, Spectrum Applications, 2002, pp. 1-7.
"Fast Fourier Transform," http://cas.ensmp.fr~chaplais/Wavetour_presentation/transformees/Fourier/FFTUS.html, pp. 1-2 (date unknown).
"Continuous Time Aperiodic Signals: The Fourier Transform," http://ece.ucsd.edu/~cruz/ece.101/notes/nodes32.html, 1996, pp. 1-2.
"Convolution", http://www.wam.umd.edu~toh/spectrum/Convolution.html, printed Jul. 2002, pp. 1-2.
IEEE Std 802.3-2002, "IEEE Standard for Information technology—Telecommunications and information exchange between systems—Local and metropolitan area networks—Specific requirements, Part 3: Carrier sense multiple access with collision detection (CSMA/CD) access method and physical layer specifications," *The Institute of Electrical and Electronics Engineers, Inc.,* Mar. 8, 2002.
IEEE Std 802.3-2005, "IEEE Standard for Information technology—Telecommunications and information exchange between systems—Local and metropolitan area networks—Specific requirements, Part 3: Carrier sense multiple access with collision detection (CSMA/CD) access method and physical layer specifications," *The Institute of Electrical and Electronics Engineers, Inc.* Sections 1-5, Dec. 9, 2005.
IEEE Draft P802.3ae/D5.0 Supplement to Carrier Sense Multiple Access with Collision Detection (CSMA/CD) Access Method & Physical Layer Specifications—Media Access Control (MAC) Parameters, Physical Layer, and Management Parameters for 10 Gb/s Operation *The Institute of Electrical and Electronics Engineers, Inc.,* May 1, 2002.
Oscar Agazzi, et al., "10Gb/s PMD Using PAM-5 Trellis Coded Modulation", Broadcom, *IEEE* 802.3, Albuquerque, New Mexico, Mar. 6-10, 2000, 38 pages.
Jamie E. Kardontchik, "4D Encoding in Level-One's Proposal for 1000BAS-T", Advanced Micro Devices, Aug. 21, 1997—Rev. B, pp. 1-24.
Erich F. Haratsch, et al., "A 1-Gb/s Joint Equalizer and Trellis Decoder for 1000BASE-T Gigabit Ethernet", *IEEE Journal of Solid-State Circuits,* vol. 36, No. 3, Mar. 2001, pp. 374-384.
Mehdi Hatamian, et al., "Design Considerations for Gigabit Ethernet 1000Base-T Twisted Pair Transceivers", IEEE 1998 Custom Integrated Circuits Conference, pp. 335-342.
Gottfried Ungerboeck, "Trellis-Coded Modulation with Redundant Signal Sets", *IEEE Communications Magazine,* Feb. 1987, vol. 25, No. 2, pp. 5-21.
M.P. Sellers, et al., "Stabilized Precoder for Indoor Radio Communications", *IEEE Communications Letters,* vol. 4, No. 10, Oct. 2000, pp. 315-317.
"Wirescope 350—Understanding ELFEXT", © Agilent Technologies, 2 pages.
Prof. David Johns, University of Toronto, "Equalization", © D.A. Johns 1997, 29 pages.
David Smalley, "Equalization Concepts: A Tutorial", Atlanta Regional Technology Center Texas Instruments, Oct. 1994, pp. 1-29.
Richard D. Wesel, et al. "Achievable Rates for Tomlinson-Harashima Precoding", *IEEE Transactions on Information Theory,* vol. 44, No. 2, Mar. 1998, pp. 824-831.
Wolfgang H. Gerstacker, et al., "Blind Equalization Techniques for xDSL Using Channel Coding and Precoding", submitted to AEU Int. J. Electr. Commun., May 1999, pp. 1-4.
Chip Fleming, "A Tutorial on Convolutional Coding with Viterbi Decoding", © 1999-2002, Spectrum Applications, pp. 1-6.
"ELFEXT—Introduction", Fluke Networks$^{SM}$, © 2000, pp. 1-2.
"Iowegian's dspGuru FIR FAQ Part 2: Properties", °1 1999-2000 Iowegian International Corp., pp. 1-4.
"28.5 Protocol Implementation Conformance Statement (PICS) Proforma for Clause 28, Physical Layer Link Signaling for 10 Mb/s, 100 Mb/s and 1000 Mb/s Auto-Negotiation on Twisted Pair", *IEEE Std.* 802.3, 1998 Edition, pp. 6-14 and 18-44.
M. Tomlinson, "New Automatic Equalizer Employing Modulo Arithmetic", *Electronic Letters,* vol. 7, 1971, pp. 138-139.
H. Harashima and M. Miyakawa, "Matched-Transmission Technique for Channels with Intersymbol Interference", *IEEE Transactions on Communications,* Vol. COM-20, No. 4, Aug, 1972, pp. 774-780.
P. Kabal and S. Pasupathy, "Partial-Response Signaling", *IEEE Transactions on Communications,* vol. COM-23, No. 9, Sep. 1975, pp. 921-934.
R.F.H. Fischer, W.H. Gerstacker, and J.B. Huber, "Dynamics Limited Precoding, Shaping, and Blind Equalizations for Fast Digital Transmission Over Twisted Pair Lines", *IEEE Journal of Selected Areas in Communications,* vol. 13, No. 9, Dec. 1995, pp. 1622-1633.
R.F.H. Fischer and J.B. Huber, "Comparison of Precoding Schemes for Digital Subscriber Lines", *IEEE Transactions on Communications,* vol. 45, No. 3, Mar. 1997, pp. 334-343.
Li, M.; Wang, S., T. Tao, T. Kawasniewski, "FIR Filter Optimization as Pre-emphasis of High Speed Backplane Data Transmission", *Electronics Letters,* Jul. 8, 2004, vol. 40, No. 14, 2 pages.
"Transformer Polarity", Copyright 2002 Kilowatt Classroom, 11C, 4 page (date unknown).
"Application Note—Design of H.F. Wideband Power Transformers; Part II—EC07213", Philips Semiconductors, Mar. 23, 1998, pp. 1-10.
"Technical Information—Use of Ferrites in Broadband Transformers", Fair-Rite Products, Corp., 14$^{th}$ Edition, pp. 170-173 (date unknown).

(56) References Cited

OTHER PUBLICATIONS

Christopher T. DiMinico of Cable Design Technoloiges (CDT) Corporation, Massachusetts and Paul Kish of NORDX/CDT, Montreal, Canada, "Development of Equal Level Far-End Crosstalk (ELFEXT) and Return Loss Specifications for Gigabit Ethernet Operation on Category 5 Copper Cabling", 10 pages (date unknown).
Shao-Po Wu, et al., "FIT Filter Design via Semidefinite Programming and Spectral Factorization", Information Systems Laboratory, Stanford University, CA, 6 pages (date unknown).
J. Ježek, Institute of Information Theory and Automation, Prague, Czec Republic, et al., "New Algorithm for Spectral Factorization and its Practical Application", pp. 1-6 (date unknown).
"ADSL Tutorial", http://www.dslforum.org.aboutdls/ads 1 tutorial.html, pp. 1-3 (date unknown).
"Introduction to DSP", http://www.bores.com/courses/intro/filters/4fir.htm, pp. 1-2 (date unknown).
"QAM_VR-QAM Demodulator with Variable Rate", DesignObjects™ by sci-worx, pp. 1-2 (date unknown).
"Description of Algorithms (Part 1)", http://pw1.netcom.com/_chip.f/viterbi/algrthms.html, pp. 1-7 (date unknown),
"Convolution", http://www.wam.umd.edu/_toh/spectrum/Convolution.html, pp. 1-2 (date unknown).

* cited by examiner

METHOD AND SYSTEM FOR A MULTI-RATE GIGABIT MEDIA INDEPENDENT INTERFACE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

PRIORITY CLAIM

This application [claim] *is a reissue continuation application of U.S. application Ser. No. 13/474,515, filed on May 17, 2012, which is a reissue application of U.S. application Ser. No. 11/894,990 (U.S. Pat. No. 7,720,068), filed on Aug. 21, 2007, which claims* priority to U.S. provisional patent application entitled Method And System For A Multi-rate Gigabit Media Independent Interface filed on Aug. 23, 2006 and assigned Ser. No. 60/839,986. *U.S. application Ser. No. 13/474,515 is incorporated by reference herein it its entirety.*

FIELD OF THE INVENTION

The invention relates to communication systems and in particular to a method and apparatus for interfacing different transmit rate communication systems.

OVERVIEW AND INTRODUCTION

With the accelerating deployment of Gigabit Ethernet there is a great need for data center equipment supporting a much faster rate in order to handle the aggregation of multiple gigabit links. In response, the IEEE 802.3 working group developed 10 gigabit (10 G) Ethernet. At first, only fiber optic media was specified to support 10 G Ethernet. Soon afterward a very short reach copper media standard was developed, known as 10GBASE-CX4. In June 2006 the 10GBASE-T standard (Clause 55) was approved by IEEE and specifies 10 G Ethernet over unshielded twisted pair (UTP) which is also used with the highly successful 10 megabit (10BASE-T), 100 megabit (100BASE-TX) and gigabit (1000BASE-T) Ethernet copper standards.

The arrival of 10GBASE-T brings a new capability to 10 G Ethernet equipment. That is the capability of operating with link partners of speeds from 10 megabit per second (Mbps) to 10 gigabit per second (Gpbs). However, there is no IEEE defined multi-rate interface between the media access controller (MAC) and the physical layer device (PHY).

802.3 is the IEEE standard for Ethernet networking. 802.3 clauses 44 through 55 define the set of physical coding sub-layers (PCS), physical media attachments (PMA) and physical media dependants (PMD) for operation at 10 gigabit per second. Clause 46 defines the 10-gigabit media independent interface (XGMII) that serves as the universal interface between a 10 G media access controller (MAC) and the PCS regardless of the choice of media. XGMII is a 4 byte parallel interface operating at 312.5 MHz. Clause 47 defines the XGMII extension sub-layer (XGXS) and it's interface, the 10-gigabit attachment unit interface (XAUI). XAUI allows the XGMII to be extended across longer distances by serializing the 4 bytes into four serial lanes operating at 3.125 Gbps. Another extension of XGMII known as 10 Gigabit small form factor interface (XFI) is a single lane 10.3 Gbps serial interface using the PCS define in Clause 48 for 10GBASE-R.

802.3 also defines sets of PCS, PMA, and PMD for copper and fiber optic media at rates of 10 Mbps, 100 Mbps, and 1 Gbps each with a corresponding defined interface between the MAC and PCS. For 10 Mbps and 100 Mbps this is the media independent interface (MII) and for a 1 Gbps system it is the gigabit media independent interface (GMII).

However, 802.3 does not define a multi-rate media independent interface. For systems supporting 10 Mbps, 100 Mbps and 1 Gbps, known as 10/100/1000, various solutions were developed within the industry as defacto standards. One of these solutions was SGMII in which GMII is processed by the PCS defined in 802.3 Clause 36 for 1000BASE-X. The GMII is encoded using 8B10B coding and serialized for transmission at 1.25 Gbps.

FIGS. 1A-1E illustrate a block diagrams of prior art systems. As shown in FIGS. 1A-1E, various prior art embodiments as discussed herein have been proposed to interface between the MAC and the PHY, but these system suffer from numerous drawbacks. For example, there is currently no IEEE defined standard nor a defacto standard for a multi-rate media dependent interface supporting 10 Gbps rates. There is a need for a multi-rate MII supporting 10 Mbps, 100 Mbps, 1 Gbps and 10 Gbps operation. In a multi-port switch application there is an additional need for the multi-rate MII to use as few signals as possible in order to reduce the pin count of the MAC or switch fabric IC.

Several solutions have been proposed, but these proposed solutions do not adequately address the drawbacks of the prior art. For example, the Serial-GMII Specification: ENG-46158 is an industry de-facto standard written and maintained by Cisco Systems. The Serial Gigabit Media Independent Interface (SGMII) is designed to convey network data and port speed between a 10/100/1000 PHY and a MAC. SGMII is specified to operate in both half and full duplex and at all port speeds. However SGMII does not support 10 gigabit operation, and does not support the XGMII interface defined for 10 G Ethernet. Other drawbacks exist with various other prior art systems.

SUMMARY

To overcome the drawbacks of the prior art and to provide additional advantages, a universal interface is disclosed. In one embodiment, a rate adaptive interface is provided which is configured to interface a MAC device with a PHY device. In such an embodiment, the interface comprises a rate adaptation module in communication with a MAC device, the rate adaptation module configured to receive data at a rate selected from 10 Mb/s, 100 Mb/s, and 1 Gb/s and process the data to a rate of 1 Gb/s, which is in turn output at a rate of 1 Gb/s. The interface also comprises an encapsulation/recovery module configured to receive the data at a rate of 1 Gb/s from the rate adaptation module and then encapsulate the data at a rate of 1 Gb/s to generated data at a rate of 10 Gb/s. A multiplexer is configured to receive the data at a rate of 10 Gb/s from the encapsulation/recovery module or to received data from a MAC device at a rate of 10 Gb/s and selectively output data at a rate of 10 Gb/s responsive to a mode selection control signal. The mode selection module is configured to control the multiplexer based on control input from a higher layer device. An ordered set generation and detection module is also part of this embodiment and is in communication with the multiplexer and the mode selection module. The ordered set generation and detection module is configured to detect ordered sets which announce a mode change such that the ordered set generation and detection module is in communication with the mode selection module.

In one embodiment, the encapsulation/recovery module is further configured to recover encapsulated data thereby changing the data rate from a 10 G data rate to a 1 G data rate. In one configuration, the encapsulation/recovery module is further configured with an input to receive data at a rate of 10 Gb/s and perform recovery thereon to output the data at a rate of 1 Gb/s. It is also contemplated that the system of Claim 1, wherein the mode selection module adjusts the data rate of operation between 10 Mb/s, 100 Mb/s, or 1 Gb/s.

Also disclosed herein is a rate adaptive interface for use in a network device. In this configuration the interface comprises a MAC device configured to output data from a first port at a variable first rate and from a second port at a second rate. A rate adaptation module is part of this embodiment and configured to receive data from the MAC at the variable first rate and convert the data at the variable first rate to data at the second rate. An encapsulation module configured to receive data at the second rate from the rate adaptation module and convert the data at the second rate to data at a third rate. From there, a switch is configured to interface with the encapsulation module and the MAC device to receive data at a rate of 10 Gb/s from either the encapsulation module or from the second port of the MAC device and then output the data at a rate of 10 Gb/s. The switch may be controlled by a mode selection control signal. In this embodiment, a mode selection module is configured to provide the mode selection control signal to the switch to thereby control operation of the switch.

It is further contemplated that the system further comprise an extension sublayer configured to receive data at a rate of 10 Gb/s from the switch, such that the extension sublayer extends the distance which the data at a rate of 10 Gb/s may be transmitted. In addition, the system may further comprise an ordered set generation and detection module configured interface with the switch to detect ordered sets which determine a mode change, such that the ordered set generation and detection module is in communication with the mode selection module. The encapsulation/recovery module may be further configured to recover encapsulated data thereby changing the data rate from a 10 G data rate to a 1 G data rate. In one embodiment, the data at the variable first rate comprises data at a rate of 10 Mb/s, 100 Mb/s, or 1 Gb/s, and data at the second rate comprises data at a rate of 1 Gb/s and data at the third rate comprises data at a rate of 10 Gb/s. In addition, the data at the third rate may have a format that is different than the data at the second rate. This system may further comprise a PHY Device configured to receive data at a rate of 10 Gb/s from the switch. In one embodiment, the first port and the second port comprise input/output ports and the switch is configured to receive and transmit data to either of the second port of the MAC device or the encapsulation module.

Also disclosed herein is a method for interfacing a multirate MAC device with a PHY device in a network communication device. In this example embodiment, this the method comprises outputting unprocessed data from the multirate MAC device at a variable rate to a rate adaptation module or at a first fixed rate to a multiplexer. The method processes the data at the rate adaptation module to upconvert the data at a variable rate to data at a second fixed rate. Then, the method processes the data at the second fixed rate with an encapsulation module to generate processed data at the first fixed rate. In this embodiment, the method receives, at a multiplexer, the unprocessed data from the MAC device at the first fixed rate or the processed data at the first fixed rate, and also receives, at the multiplexer, a mode selection signal. Responsive to the mode selection signal, the operation outputs from the multiplexer the unprocessed data at the first rate or the processed data at the first rate. In one variation, the variable rate consists of 10 Mb/s, 100 Mb/s and 1 Gb/s. It is contemplated that the first fixed rate comprises 10 Gb/s and the second fixed rate comprises 1 Gb/s. In addition, processing the data at the second fixed rate with an encapsulation module further comprise altering the format of the data. This method may further comprise outputting the data from the multiplexer to an extension sublayer, a PHY device, or a second multiplexer. In this embodiment, up-sampling may comprise padding or repeating data received at the variable rate to create data at a second fixed rate. This method may also comprise establishing a mode of operation and receiving data at the first fixed rate at the multiplexer from any of a PHY device, an extension sublayer, or a second multiplexer. Then, responsive to the mode of operation, the method outputs the data at the first fixed rate to either the MAC device or to a recovery unit. In addition, responsive to the outputting the data at the first fixed rate to a recovery unit, the method converts the data at the first fixed rate to the second fixed rate and converts the data at the second fixed rate to data at a third fixed rate, such that the data at the third fixed rate is a rate selected from a group of variable *rates supported by the MAC*.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION

An example UGMII (Ultra-serial Gigabit Media Independent Interface) Specification as disclosed herein is a proposed specification for a multi-rate 10 G capable MII. Although one example preferred embodiment is described herein, it is contemplated that numerous other embodiments may be enabled based on the teachings provided herein although such embodiments may differ slightly from the exact structure shown.

In the UGMII system described herein the defined signals for GMII may be fully encapsulated without modification, transported across the (extended) XGMII interface and reconstructed at the MAC RX and PHY TX inputs.

Figure 1A:
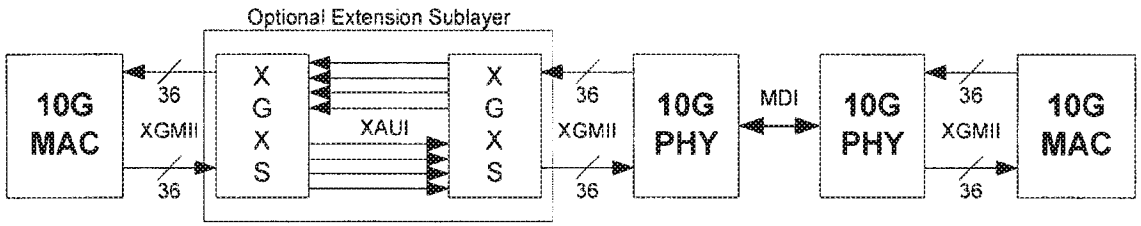
Fig. 1A Prior Art
FIG. 1A-1E is a block diagram illustrating an example embodiment of prior art systems.
Figure 1B:
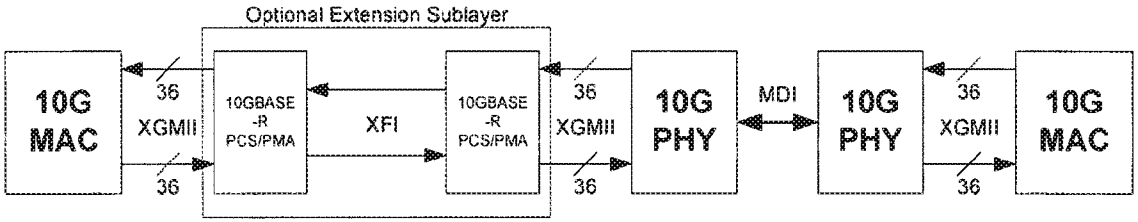
Fig. 1B Prior Art
Figure 1C:
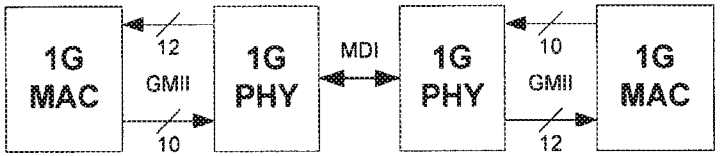
Fig. 1C Prior Art
Figure 1D:
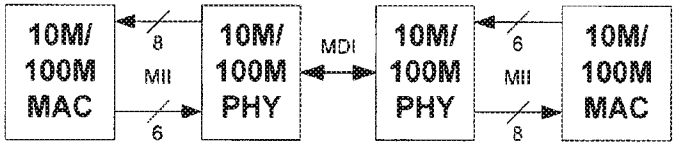
Fig. 1D Prior Art
Figure 1E:
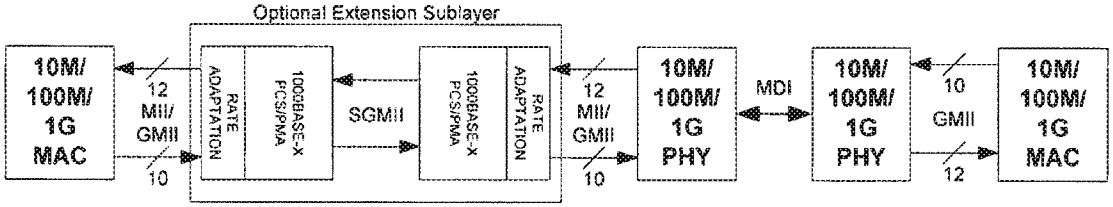
Fig. 1E Prior Art
Figure 1F:
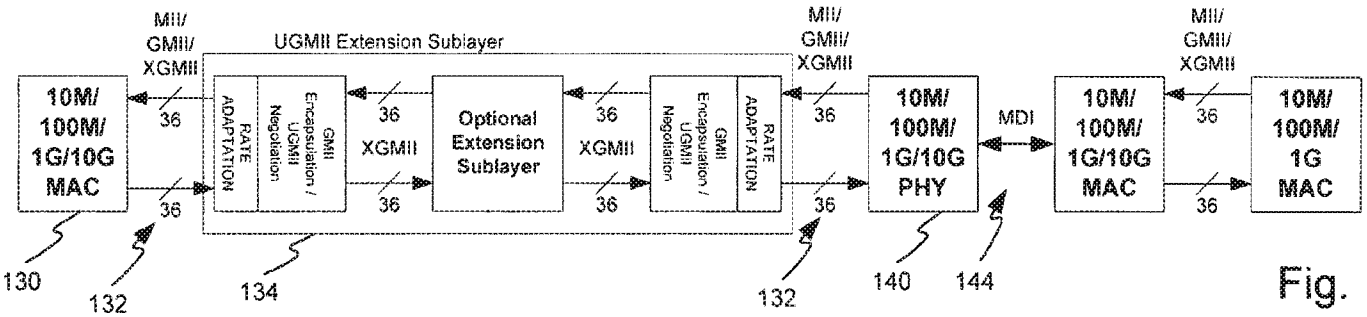
FIG. 1F is a block diagram illustrating an example embodiment of an UGMII system as disclosed herein.

FIG. 1F illustrates an example embodiment of a UGMII interface in relation to the MAC and PHY components of a communication system. The term UGMII represents a universal gigabit media independent interface. In this embodiment, the MAC (media access control device) 130 is capable of operation at any data rate, which in this embodiment may be 10 megabits per second (Mb/s), 100 Mb/s, 1 Gigabits per second (Gb/s), or 10 Gb/s. The MAC 130 may comprise any type make device currently in existence, such as defined by one or more IEEE standards, or developed in the future capable of addressing and channel access control. MAC 130 configuration and operation is generally understood by one of ordinary skill in the art and as such, is not described in detail herein.

The MAC 130 communicates with the UGMII module 134 via the conductor paths 132 as shown. The conductor paths 132 may comprise 36 parallel lines as shown, or any other type connection. The data exchange format between the MAC 130 and the UGMII module 134 may comprise any of [MII] *GMII*, MII or XGMII as shown. XGMII is defined by one or more IEEE standards and as such, is not described in detail herein, but it does suffer from the drawback of not adapting to rates. One such drawback is that it is fixed at 10 Gb/s.

The UGMII module 134 is configured to convert any rate of incoming or outgoing data between the MAC 130 and a PHY 140 to thereby provide a universal intermediate device capable of interfacing multi-rate MAC and PHY modules. In this embodiment, the UGMII module 134 includes 10 gigabit data rate transfer capability. The UGMII module 134 is described below in detail in connection with FIG. 2. The UGMII 134 may be configured in hardware, software, or a combination of both. Rate information will be provided to the UGMII in any manner, such as but not limited to, from the PHY, the MAC, or via ordered sets, or automatically detected.

The output of the UGMII module 134 [connect] *connects* to a PHY 140. In this embodiment, the PHY (physical layer device) 140 is capable of operation at any data rate, which in this embodiment may be 10 megabits per second (Mb/s), 100 Mb/s, 1 Gigabits per second (Gb/s), or 10 Gb/s. The PHY 140 may comprise any type of device currently in existence, such as defined by one or more IEEE standards, or developed in the future [capable of addressing and channel access control]. PHY 140 configuration and operation is generally understood by one of ordinary skill in the art and as such, is not described in detail herein.

The output of the PHY 140 connects to the channels 144, represented by MDI. MDI channels 144 may comprises a multi-line channel, such as but not limited to CAT 3, CAT 5, CAT 5E, CAT 6, CAT6A, or CAT7. Shown on the left hand side of FIG. 1F, is a UGMII extension sublayer configured to enable an optional extension sublayer to thereby extend on-board or inter-system transmit distances.

In operation, the UGMII system performs numerous different functions. In this example embodiment the first aspect of the invention is mode selection. In this embodiment, mode selection comprises the negotiation between the UGMII extension sublayers located at the MAC and PHY to select between one of several operational modes including: XGMII communication, GMII encapsulation, Clause 22 MDIO register management and Clause 45 MDIO register management. The management aspects of the PHY or MAC set the exact link speed, which may be based on the capability of the channel or hardware. In one embodiment, selection of UGMII and XGMII operating modes, or any other operating mode, are negotiated between the MAC and PHY using ordered sets to announce and acknowledgement a mode change. In one embodiment 802.3 Clause 46 defined ordered sets are utilized. The Clause 22 and 45 define the universal standard set of management registers to give status and control of the physical layer. These clauses defined the address, location, and control data stored therein.

In this example embodiment a device incorporating UGMII system enables the support the following interface modes.

- XGMII: Operates as defined in IEEE STD 802.3-2005, Carrier sense multiple access with collision detection (CSMA/CD) access method and physical layer specifications, December 2005, which is hereby incorporated in its entirety herein;
- GMII Encapsulation: perform encapsulation and transport of GMII interface signals;
- Clause 22 management: perform management register read and write operations across the XGMII or extension; and
- Clause 45 management: perform management register read and write operations across the XGMII or extension.

Figure 2:
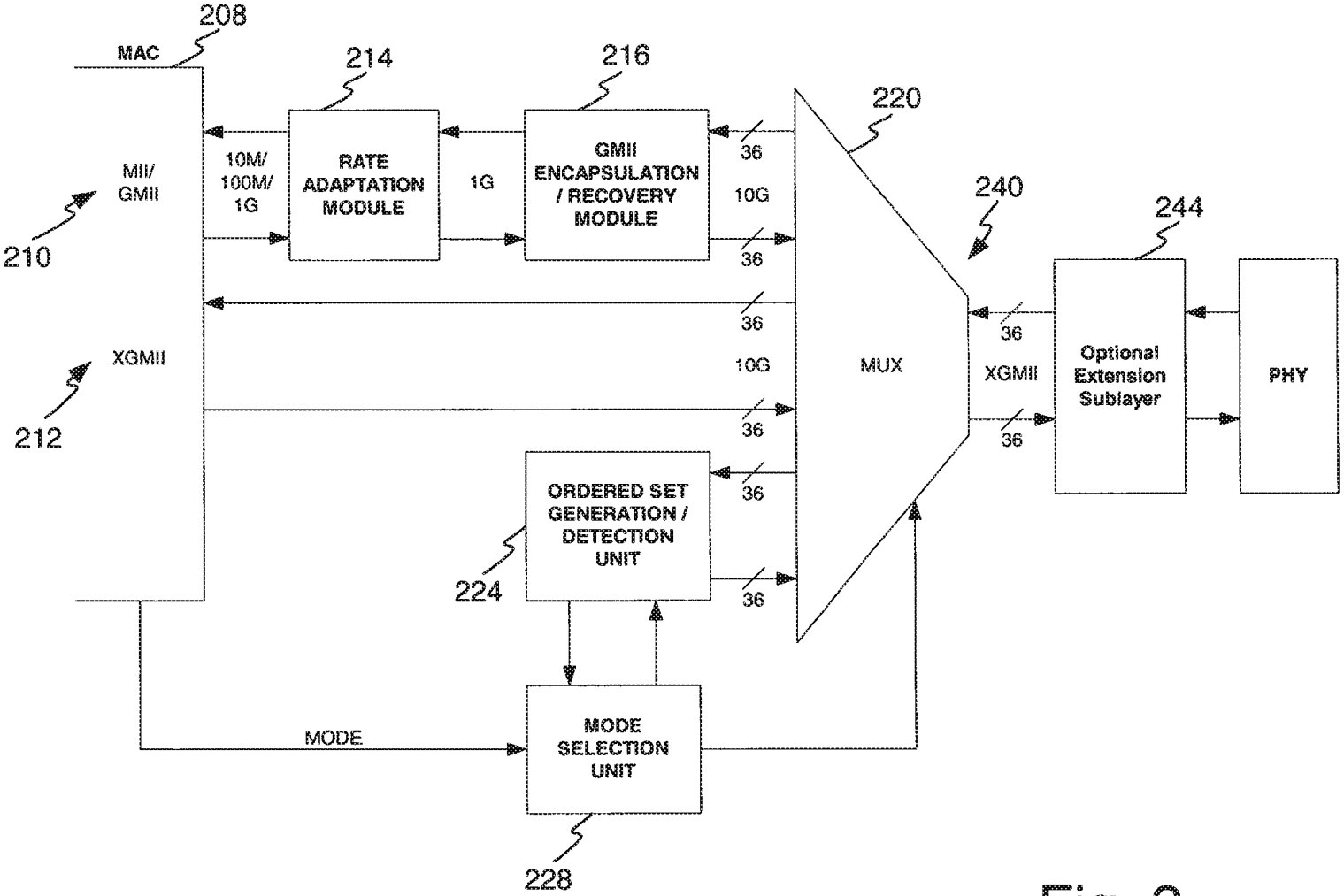
FIG. 2 is a block diagram of an example embodiment of a UGMII system as disclosed herein connected to an optional extension sublayer module.

FIG. 2 illustrates a block diagram of an example embodiment of a UGMII system as disclosed herein connected to an optional extension sublayer module. In this example embodiment, a MAC module 208 includes an MII/GMII I/O port 210 and a XGMII I/O port 212. The MAC may be considered the end point of the universal interface. In this example embodiment, MII/GMII I/O port 210 is capable of receiving and transmitting data at 10 Mb/s, 100 Mb/s and 1 Gb/s. The XGMII port 212 is capable of receiving and transmitting data a rate of 10 Gb/s. In other embodiments other rates than these may be implemented or specified.

The rate adaptation module 214 may also be configured as hardware, software, or a combination of both and be configured to adapt the rate of lower speed data up to a higher rate, such as GMII 1 Gb/s rate. The MII/GMII I/O port 210 connects the MAC 208 to a rate adaptation module 214 which is configured to adapt the variable rate from the MAC 208 to a constant rate of 1 Gb/s. At a rate of 1 Gb/s, the rate adaptation module 214 connects to a GMII encapsulation/recovery module 216. The GMII encapsulation/recovery module 216 up converts data received from the rate adaptation module 214 at 1 Gb/s to a rate of 10 Gb/s, which is in turn provided to a multiplexer 220. GMII data is used to create small packets or frames to be transmitted across the XGMII and may be padded with zeros or other pad data.

Conversely, data received from the multiplexer 220 at a rate of 10 Gb/s is converted to a 1 Gb/s rate by the GMII encapsulation/recover module 216. The multiplexer 220 also receives data without rate conversion from the MAC 208 via the XGMII I/O port as shown. The input and output from the multiplexer 220 on the MAC 208 side occurs over 36 parallel conductors at a rate of 10 Gb/s, but in other embodiments, other rates may be utilized. The path between the rate adaptation module 214 and the GMII encapsulation/recovery module 216 may comprise any type path, but in this embodiment comprises 12 parallel conductors.

Also connecting to the multiplexer 220 on the MAC 208 side is an ordered set generation and detection unit 224 which is configured to communicate with the multiplexer as shown. The ordered set generation and detection unit 224 monitors and/or generates ordered sets from the MAC 208 or the multiplexer 220, or any higher layer. The higher layer may mean any layer in the OSI model or from an application or user input. In one embodiment, the ordered set generation and detection unit 224 both sends and detects received ordered sets.

Orders sets comprise data utilized to control operation of the MAC, PHY, and/or the UGMII module. The ordered sets may be considered as control data that establish the link characteristics and may set the rate of data exchange. In one embodiment, ordered sets are not exchanged during data mode.

The ordered set generation and detection unit 224 also communicates with the mode selection unit 228. The mode selection unit 228 provides a control input to the multiplexer 220 to selectively control which sets of input/output channels to use for communication during operation. For example, if the PHY is set to operate at 10M, 100M, or 1 G, then the mode selection unit 228 will force the multiplexer 220 to use the I/O ports corresponding to the MAC I/O ports 210. Alternatively, if the rate is set at 10 Gb/s then the multiplexer 220 will be forced to utilized the I/O ports associated with the MAC 208 ports 212. In one embodiment, the mode selection unit 228 is configured to report the detection of ordered sets back to the MAC 208, but it could alternatively be done by the ordered set generation/detection unit 224. It is also possible for control data or ordered sets to be exchanged via a status line from the mode selection unit 228 to the MAC 208. In one implementation the MAC 208 would set the MUX 220 by configuring the mode selection unit 228. However, a more complex design could allow the mode selection unit 228 to set the MUX 220 based on mode setting from the MAC 208 and the detection of ordered sets The multiplexer I/O port 240 operates a 10 Gb/s and may optionally communicate with an optional extension sublayer 244 or directly with a PHY. The optional extension sublayer 244 may be utilized to extend the distances between the MAC 208 and the PHY.

Figure 3:
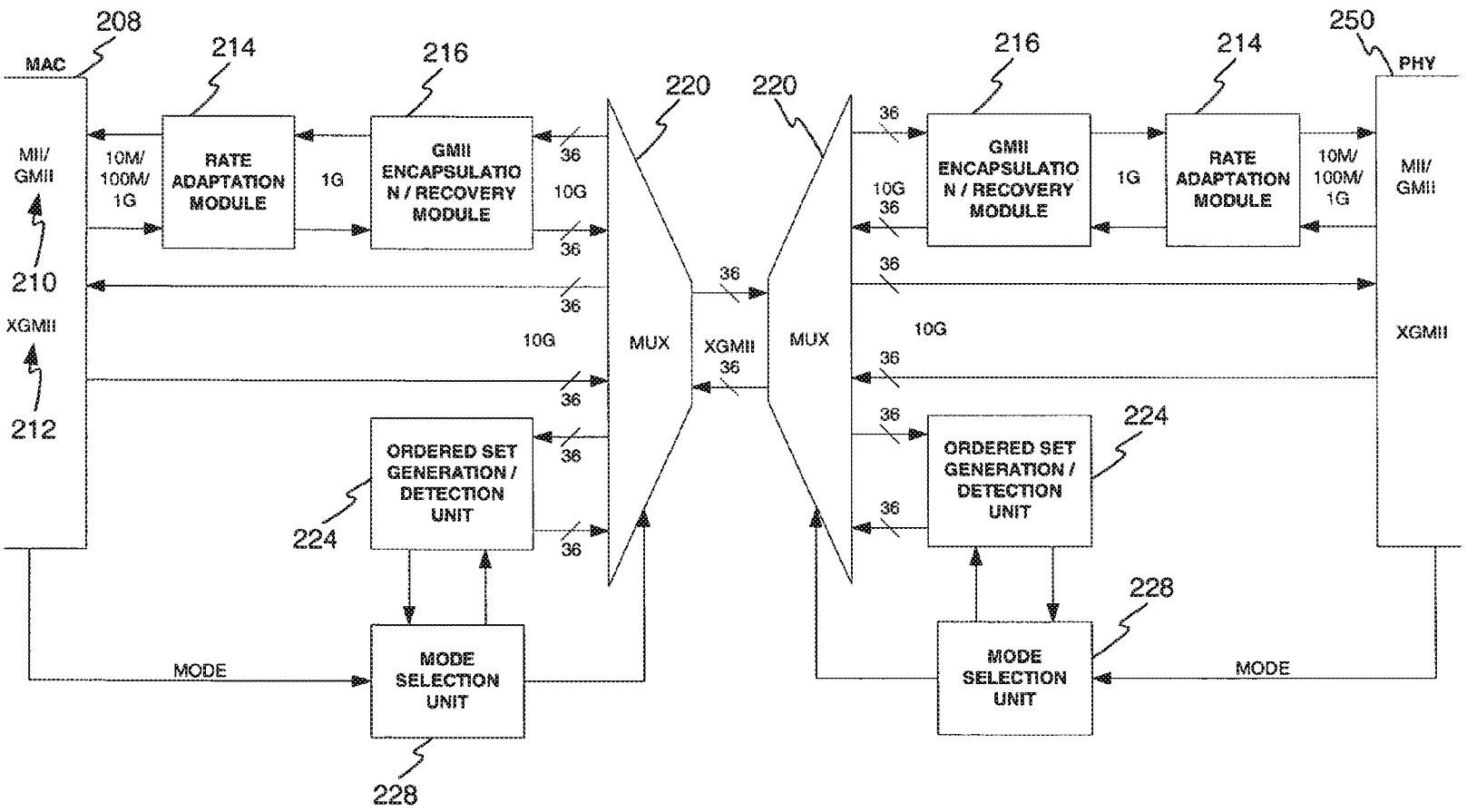
FIG. 3 is a block diagram of an example embodiment of a UGMII system as disclosed herein connected to another UGMII system via a XGMII connection.

FIG. 3 is a block diagram of an example embodiment of a UGMII system as disclosed herein connected to another UGMII system via a XGMII connection. As compared to FIG. 2, identical or similar elements are labeled with identical reference numbers. This figure illustrates the UGMII interface system interfacing a PHY and a MAC to enable operation at any rate between 10M to 10 G. In this embodiment, it is shown that two UMGII modules may be linked to provide rate adaptive connectivity between a MAC 208 and a PHY 250. An extension sublayer may be placed between the multiplexers 220 to extend the operational distance between the MAC 208 and the PHY 250.

Figure 4:
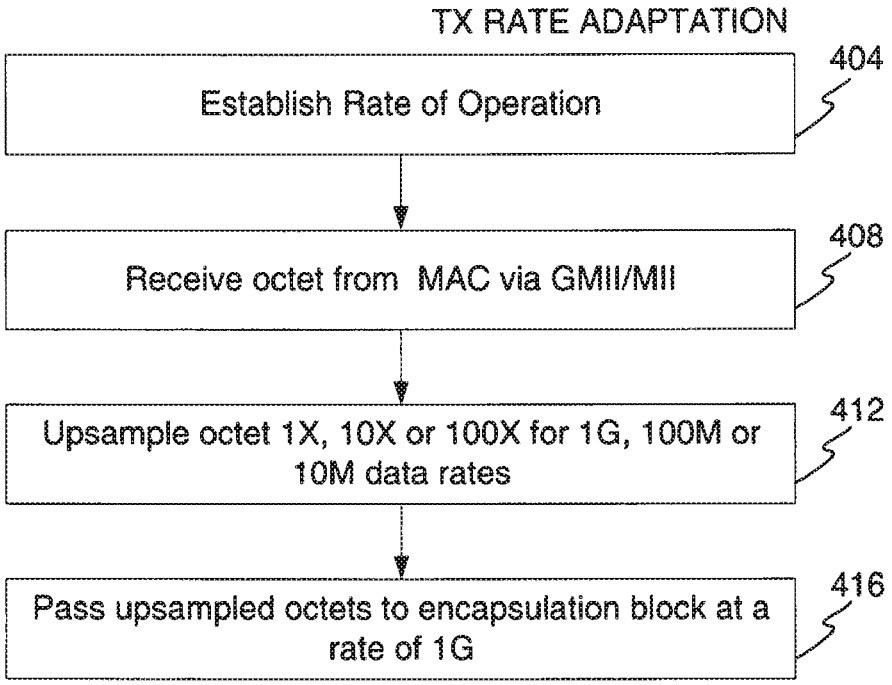
FIG. 4 is an operational flow diagram of an example method of transmit side rate adaptation in accordance with UGMII.

In this example embodiment another aspect of the invention is data up sampling which is discuss in connection with FIG. 4. In this embodiment, data up sampling comprises the conversion from a data bit rate of 10 or 100 megabits per second to a bit rate of 1000 megabits per second through the repetition of data bytes. Data encapsulation will be performed on the equivalent implementation of GMII for 10/100/1000 PHYs operating at 125 MHz. For PHYs operating lower than 1000 Mbps data upsampling may be performed prior to encapsulation. For operation in 100 Mbps mode every octet in a frame is repeated 10 times. For operation in 10 Mbps mode every octet in a frame is repeated 100 times. At the far end of the UGMII after the GMII is reconstructed the octets will be downsampled by 10 for 100 Mbps operation or by 100 for 10 Mbps operation. In this discussion, octets are utilized as a unit of data, but in other embodiments, other data units may be utilized.

Up sampling can be replaced by one of several other means for rate adaptation including idle stuffing between data bytes. FIG. 4 illustrates one example method of transmit side rate adaptation. In FIG. 4 at a step 404, the rate adaptation system determines the rate of operation. This may by any rate, but in this example embodiment comprises a rate selected from 10M, 100M, 1 G, and 10 G. At a step 408 the operation receives an octet of information from the MAC via the GMII or MII, in the case of the rate being selected at 10M, 100M, or 1 G. In other embodiments, the data may be received in units other than octets.

After receipt and at step 412, the operation up samples the octet one time, ten times, or one hundred times for the rates of 1 G, 100M or 10M respectively. For example, to create a data rate of 1 G from a 10M receive rate, up sampling occurs at a rate of 100 times. Up sampling may occur by repeating the received octet or padding with created pad bits. Thereafter, at step 416, the operation passes the up sampled octets to the encapsulation block at a rate of 1 G. As a result, data received at a variable rate is output at a constant rate of 1 G.

Figure 7:
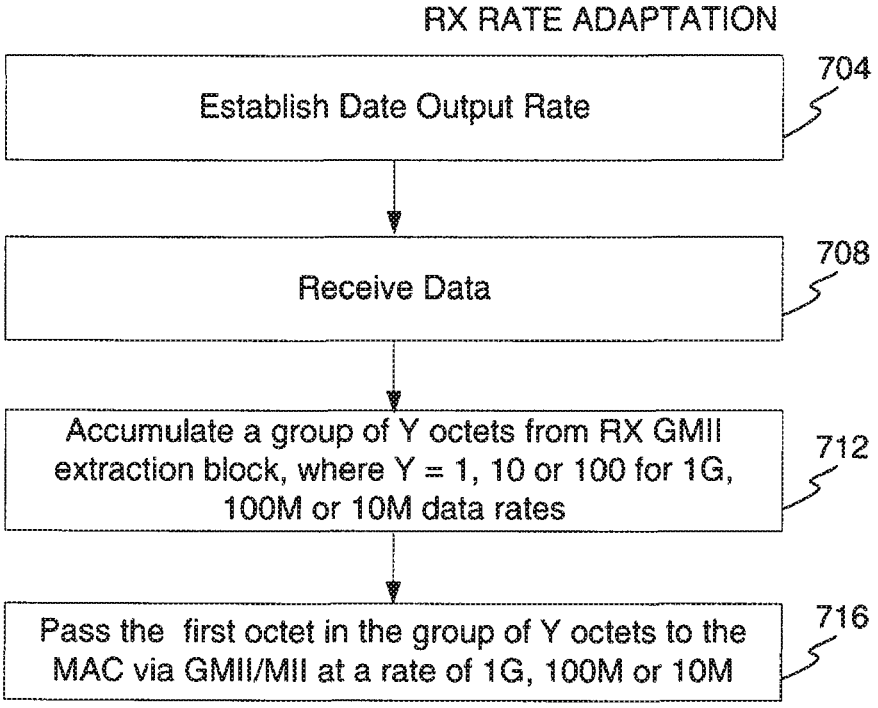
FIG. 7 is an operational flow diagram of an example method of receivers side rate adaptation in accordance with UGMII.

FIG. 7 illustrates one example method of receiver side rate adaptation. The operation of FIG. 7 is similar to the operation of FIG. 4. However, instead of up sampling, down sampling occurs. In FIG. 7, at a step 704, the operation establishes a data output rate or rate of operation. Then at step 708, the adaptation module receives the data. At a step 712, the adaptation module accumulates groups of Y octets from the receiver GMII extraction block. In this embodiment, the variable Y may comprise 1, 10, or 100 for 1 G, 100 m or 10M data rates respectively. In other embodiment Y may comprise other numeric values. After accumulation of Y number of octets, the operation advances to step 716 and passes the first octet in the group of Y octet to the MAC via the GMII/MII at a rate of 1 G, 100M, or 10M. In this manner, the operation down converts data received at a rate of 1 G to an adaptive output rate.

Figure 5:
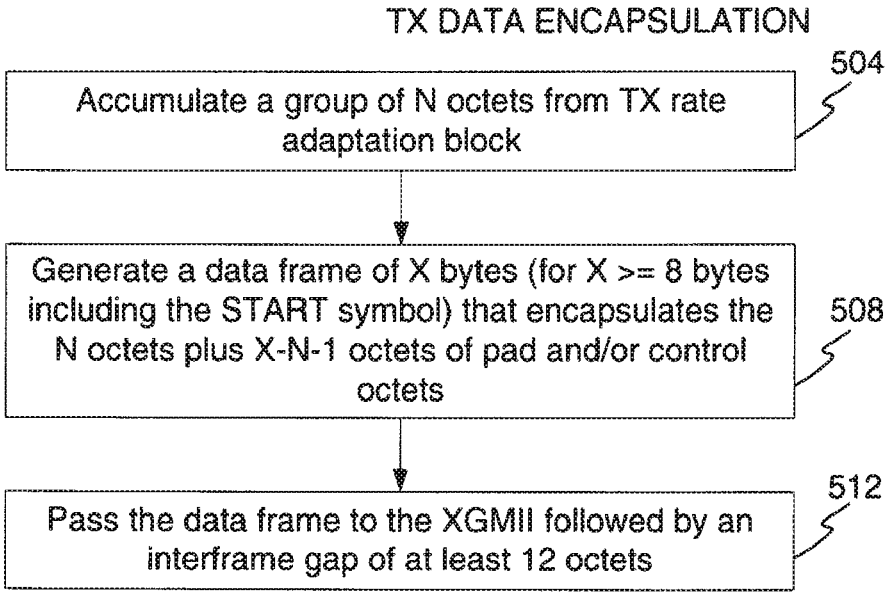
FIG. 5 is an operational flow diagram of an example method of transmit side data encapsulation in accordance with UGMII.

Another aspect of the invention is GMII encapsulation. FIG. 5 illustrates an example method of encapsulation. In this embodiment, GMII encapsulation comprises the operation of generating a data frame for transport across the XGMII and/or extension sublayer using data presented at the GMII. FIG. 5 illustrates one example method of transmit side data encapsulation. In this example embodiment, at a step 504, the encapsulation module accumulates a group of N octets from the transmit rate adaptation block. Thereafter at step 508, the encapsulation module generates a data frame of X byes that encapsulates the N octets plus additional octets of pad and or control octets. In one embodiment, N equals 2. In other embodiments other frame generation and padding schemes may be implemented. Then, at a step 512, the operation passes the data frame to the multiplexer at the XGMII rate followed by an interframe gap. The interframe gap may comprise at least 12 octets, which is the minimum interframe gap size defined in IEEE 802.3 Clause 46. The data frame will depend on the value of N. For N equal two, two octets from GMII would be encapsulated creating a data frame that is 8 bytes. Those 8 bytes would include the start character, which can be followed by the terminate character and 11 idle bytes. It is contemplated that part of the encapsulation operation comprises a change in format and not only a change in rate. In this embodiment, the data input to the encapsulation module is at a rate of 1 G (GMII), and output at a rate of 10 G (UGMII).

GMII is defined in Clause 35 of IEEE STD 802.3-2005, Carrier sense multiple access with collision detection (CSMA/CD) access method and physical layer specifications, December 2005, which is incorporated herein in its entirety. In this example embodiment disclosed herein, the MAC transmits to the PHY using data signals TXD<7:0>, transmit enable TX_EN, and transmit error TX_ER. The PHY transmits to the MAC using data signals RXD<7:0>, data valid RX_DV, receive error RX_ER, and carrier sense CRS. In other embodiments different MAC transmit schemes may be utilized. In one embodiment, encapsulation is performed on a block of N GMII transfers (octets) and generates multiple XGMII transfers.

On the transmit side of the MAC N (for N>1) octets of data, TXD(0)<7:0> to TXD(N−1)<7:0>, along with control signals, TX_EN(0:N−1) to TX_ER(0:N−1), are encapsulated within a very short data frame. This frame contains X bytes including the start symbol, /S/, and is at least 8 bytes (the smallest frame supported by the 10GBASE-R PCS). The data frame is followed by an inter-frame gap (IFG) of at least 12 bytes including the terminate symbol, /T/. For N=2, the total encapsulation requires 20 bytes, the equivalent of 2 GMII or 5 XGMII transfers.

Optionally, the remaining bytes in the encapsulation frame may contain management data exchanges that allow for reading and writing of Clause 22 management registers.

Figure 6:
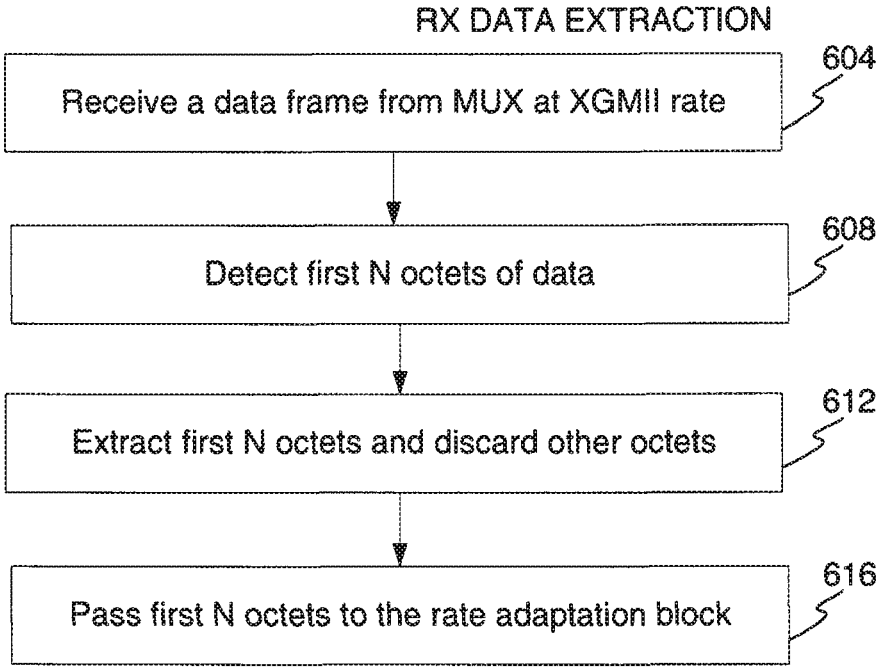
FIG. 6 is an operational flow diagram of an example method of receiver side data extraction in accordance with UGMII.

At the PHY transmit input, the short frame is received and the N GMII octets are reconstructed (from UGMII rate) along with control signals and presented to the PHY as GMII signals. FIG. 6 illustrates one example method of operation of the PHY side data extraction. In operation, in this embodiment the method of extraction shown in FIG. 6 extracts data received at a XGMII rate (10 Gb/s) to generate an output at a GMII rate (1 Gb/s). At a step 604 the recovery module (element 216 in FIG. 2) receives a data frame from the MUX at a XGMII rate. During or after receipt of the data, the operation detects the first N octets of data. This occurs at step 608 and the value of N may be any number. At step 612, the operation extracts the first N octets of data and may optionally discard the remaining octets of data. The portions which may be discarded my include padding and interframe gap. Thereafter, at a step 616, the operation passes the first N octets to the rate adaptation block. It is contemplated that in this embodiment the output is at a rate of 1 Gb/s.

In addition, the remaining information within the data frame may be discarded at step 612. During the idle periods, Idle columns, ||I||, may be deleted or inserted for clock rate matching purposes as defined in IEEE STD 802.3-2005, Carrier sense multiple access with collision detection (CSMA/CD) access method and physical layer specifications, December 2005.

On the receive side of the PHY the GMII rate adaptation and encapsulation operations are performed similar to those performed on the MAC TX path.

At the MAC receive input, the short encapsulation frame is received and the N GMII octets are reconstructed along with control signals and presented to the MAC as GMII signals. Additional information within the frame may be discarded. During the idle periods (interframe gap) Idle columns, ||I||, may be deleted or inserted for clock rate matching purposes as defined in IEEE STD 802.3-2005, Carrier sense multiple access with collision detection (CSMA/CD) access method and physical layer specifications, December 2005. In one embodiment Clause 45 management may occur across the XGMII.

When placed in Clause 45 management mode UGMII may be configured to allow the MAC/host to access management registers across the XGMII or extension. This mode may use ordered sets or short frames to encapsulate the host management interface (MDIO) between the host and PHY.

The UGMII has many advantages and distinctions over prior art system. On such distinction of the invention is that is enables a multi-rate interface between MAC and PHY for 10 G Ethernet capable PHYs.

In various embodiment this invention enables:

Encapsulation and transport of the 10/100/1000 MII/GMII interface across a 10 G interconnect.

Operation in full duplex and half duplex modes.

Auto-negotiation of operating mode: either XGMII at 10 Gbps or UGMII operating at 10, 100, or 1000 Mbps Use of defined 10 G physical coding sublayers (PCS), which may also be referred to as extension sublayers, without modification. The extension sublayers may be optionally used to extend reach.

Additional advantages of further aspects of the invention are the access to Clause 22 and Clause 45 management registers in the PHY using the same 10 G interface. The separate signals MDC and MDIO, defined by IEEE 802.3, are not required.

One benefit of the invention described herein is the ability to interface a MAC to a 10/100/1000/10 G PHY (or any subset thereof) using a single 2 signal (4-pin) XFI interface, enabling greater port density per MAC IC. The XFI interface is shown in FIG. 1B and is designated by a multi-source agreement defining a small form factor configuration for a two signal interface between a MAC and PHY.

APPENDIX A SUPPLEMENT

Table of Contents

Introduction—Overview
Functional Specification
Modes of Operation
Data Upsampling
GMII Encapsulation
Clause 22 Management exchanges
Clause 45 Management
UGMII Mode Selection
Electrical Specification
Applicable Documents
Abbreviations Disclosed herein is a new interface, the Ultra-serial Gigabit Media Independent Interface (UGMII), for the purpose of connecting a PHY operating in 10/100/1000 mode to a 10 G capable MAC using a 10 G defined interface. This interface may be XGMII (74 signals), XAUI (8 signals), or 10GBASE-R/XFI (2 signals).

UGMII is designed to support one or more of the following:

Encapsulation and transport of the 10/100/1000 MII/GMII interface across a 10 G interconnect.

Operation in full duplex and half duplex modes.

Auto-negotiation of operating mode: either XGMII at 10 Gbps or UGMII operating at 10, 100, or 1000 Mbps Use of defined 10 G physical coding sublayers (PCS) without modification An additional capability of UGMII may be access to Clause 22 and Clause 45 management registers in the PHY using the same 10 G interface. Thus, in one embodiment MDC and MDIO are not required.

One benefit of UGMII is the ability to interface MAC to a 10/100/1000/10 G PHY (or any subset thereof) using a single 2 signal (4-pin) XFI interface, which in turn enables greater port density per MAC IC.

Overview

UGMII defines a protocol for the transport of the GMII defined by Clause 35 of [1] over any Ethernet 10-gigabit interface. The purpose of UGMII is to allow a 10 G capable MAC to operate with a multi-rate 10 G PHY using minimal interconnect. For the greatest reduction in interconnect, it is expected that UGMII will be used with a 10GBASE-R PCS across an XFI (10 G serial interface) operating at 10.3125 Gbps, thus requiring only 2 differential pair signals on 4 pins.

An example system utilizing UGMII is shown in the figures provided herewith. UGMII is defined at the XGMII (if implemented) such that any defined extension such as XGXS/XAUI (Clause 48 of [1]), or PCS such as 10GBASE-R over XFI may be used as the interface between MAC and PHY.

In UGMII the defined signals for GMII may be fully encapsulated without modification, transported across the (extended) XGMII interface and reconstructed at the MAC RX and PHY TX inputs.

In the example embodiment described herein, selection of UGMII and XGMII operating modes are negotiated between the MAC and PHY using ordered sets to announce and acknowledgement a mode change.

Modes of Operation

A device incorporating UGMII may be configured to support the following interface modes:

XGMII: Operates as defined in [1]

GMII Encapsulation: perform encapsulation and transport of GMII interface signals Clause 22 management: perform management register read and write operations across the XGMII or extension Clause 45 management: perform management register read and write operations across the XGMII or extension Data Upsampling Data encapsulation may be performed on the equivalent implementation of GMII for 10/100/1000 PHYs operating at 125 MHz. For PHYs operating lower than 1000 Mbps data upsampling can be performed prior to encapsulation.

For operation in 100 Mbps mode every octet in a frame can be repeated 10 times. For operation in 10 Mbps mode every octet in a frame can be repeated 100 times.

At the far end of the UGMII, after the GMII is reconstructed, the octects will be downsampled by 10 for 100 Mbps operation or by 100 for 10 Mbps operation.

GMII Encapsulation

GMII is defined in Clause 35 of [1]. The MAC transmits to the PHY using data signals TXD<7:0>, transmit enable TX_EN, and transmit error TX_ER. The PHY transmits to the MAC using data signals RXD<7:0>, data valid RX_DV, receive error RX_ER, and carrier sense CRS.

In this example embodiment, encapsulation is performed on a block of 2 GMII transfers (octets) and generates multiple XGMII transfers.

On the transmit side of the MAC two octets of data, $TXD_0$<7:0> and $TXD_1$<7:0>, along with control signals, $TX_EN_{0-1}$ and $TX_ER_{0-1}$, are encapsulated within a very short data frame. In this embodiment, this frame contains 8 bytes including the start symbol, /S/, and represents the smallest frame supported by the 10GBASE-R PCS. The data frame is followed by the minimum interframe gap (IFG) of 12 bytes including the terminate symbol, /T/. In this embodiment, the total encapsulation requires 20 bytes, the equivalent of 2 GMII or 5 XGMII transfers.

In one example embodiment, the first byte of the frame following /S/ contains the control signal information and can be constructed as: D1<7:0>=0 0 0 0 $TX_ER_1$ $TX_ER_0$ $TX_EN_1$ $TX_EN_0$. The next two bytes may be configured to carry the data: D2<7:0>=$TXD_0$<7:0> and D3<7:0>=$TXD_1$<7:0>. Optionally, the remaining four bytes, D4 to D7, may contain management data exchanges that allow for reading and writing of Clause 22 management registers.

At the PHY transmit input, the short frame is received and the two GMII octets are reconstructed along with control signals and presented to the PHY as GMII signals. Additional information within the frame may be discarded. During the idle periods Idle columns, ||I||, may be deleted or inserted for clock rate matching purposes.

On the receive side of the PHY the process may be similar to the MAC TX encapsulation. Thus, two octets of data, $RXD_0$<7:0> and $RXD_1$<7:0>, along with control signals, $RX_DV_{0-1}$ and $RX_ER_{0-1}$, may be encapsulated within an 8-byte data frame. A minimum interframe gap follows the data frame.

In this example embodiment, the first byte of the frame following /S/ contains the control signal information and is constructed as: D1<7:0>=0 0 0 0 $RX_ER_1$ $RX_ER_0$ $RX_DV_1$ $RX_DV_0$. The next two bytes may carry the data: D2<7:0>=$RXD_0$<7:0> and D3<7:0>=$RXD_1$<7:0>. Optionally, the remaining four bytes, D4 to D7, may contain management data exchanges that allow for reading and writing of Clause 22 management registers.

At the MAC receive input, the short frame is received and the two GMII octets are reconstructed along with control signals and presented to the MAC as GMII signals. Additional information within the frame may be discarded. During the idle periods, Idle columns, ||I||, ma be deleted or inserted for clock rate matching purposes.

Table 1, which follows, illustrates one example encapsulation process.

TABLE 1

Encapsulation of GMII

| XGMII group | Byte 0 | Byte 1 | Byte 2 | Byte 3 |
|---|---|---|---|---|
| 0 | /S/ | D1 | D2 | D3 |
| 1 | D4 | D5 | D6 | D7 |
| 2 | /T/ | /I/ | /I/ | /I/ |
| 3 | /I/ | /I/ | /I/ | /I/ |
| 4 | /I/ | /I/ | /I/ | /I/ |

Clause 22 Management Exchanges

It is further contemplated that the MAC/host may access Clause 22 management register through exchanges with the PHY using the last 4 bytes (or other bytes) of the GMII encapsulation frame. In other embodiments, Clause 22 Management Exchanges may occur in a different manner.

Clause 45 Management

It is further contemplated that when placed in Clause 45 management mode UGMII may allow the MAC/host to access management registers across the XGMII or extension.

In addition, various embodiments may use ordered sets or short frames as above. One potential downside to this arrangement is an inability to access management registers if UGMII is not operating or has a fault. It is contemplated that the UGMII system may be configured to access management registers even during data transmission.

UGMII Mode Selection

In the embodiment disclosed herein, the MAC selects UGMII modes of operation by sending ordered sets across XGMII or its extension.

To place the PHY in any (any particular) mode, the MAC may send an ordered set of /Q/ D1 D2 D3 with D1=96, D2=0 and [D1] *D3* set according to Table 2. When [they] *the* PHY receives one of these ordered sets, it replies with the same ordered set, but sets D2=D3 as an acknowledgement. Upon acknowledgement the MAC stops sending the ordered sets. After detecting the absence of the ordered set from the MAC, the PHY may be configured to stop sending ordered sets and begins operating in the new mode. The MAC then begins operation in the new mode and may begin transmitting data.

TABLE 2

Ordered Sets for UGMII Mode Change

| UGMII Mode | D0 | D1 | D2 | D3 |
|---|---|---|---|---|
| XGMII | /Q/ | 96 | 0/AA | AA |
| GMII Encapsulation | /Q/ | 96 | 0/55 | 55 |
| Clause 45 Management | /Q/ | 96 | 0/66 | 66 |

The following documents are incorporated by reference in their entirety herein.

IEEE STD 802.3-2005, Carrier sense multiple access with collision detection (CSMA/CD) access method and physical layer specifications, December 2005. This reference is hereby incorporated by referenced in its entirety.

IEEE Standard 802.3an-2006, Amendment 1: Physical Layer and Management Parameters for 10 Gb/s Operation—Type 10GBASET. This reference is hereby incorporated by referenced in its entirety.

The following abbreviations are used herein and defined as set forth below.

GMII Gigabit Media Independent Interface: IEEE defined interface between the 1 G PHY and the MAC MDIO Management Data Input/Output Interface MII Media Independent Interface: IEEE defined interface between the 10/100 PHY and the MAC.

MMD MDIO Manageable Device

RS Reconciliation Sublayer

XAUI Ten Gigabit Attachment Unit Interface

XGMII Ten Gigabit Media Independent Interface

UGMII Refers to the encapsulation of GMII over a 10 G link proposed in this document While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A rate adaptive interface configured to interface a [MAC] *media access control* (*MAC*) device *of a network device* with a [PHY] *physical layer* (*PHY*) device *of the network device*, the *rate adaptive* interface comprising:

a [rate adaptation] *media independent interface* module in communication with [a] *the* MAC device *implemented in one or both of circuitry and software*, the [rate adaptation] *media independent interface* module configured to[:]

receive *fixed rate* data *at a first fixed rate from a first MAC port and variable rate data* at a *variable* rate [selected from 10 Mb/s, 100 Mb/s, and 1 Gb/s;] *from a second MAC port,* process the *variable rate* data to [a] *the first fixed* rate [of 1 Gb/s;] *to generate processed data at the first fixed rate,* output the *fixed rate* data *or the processed data* at [a] *the first fixed* rate[of 1 Gb/s]; *and*

[an encapsulation/recovery module configured to receive the data at a rate of 1 Gb/s from the rate adaptation module, and encapsulate the data at a rate of 1 Gb/s to generated data at a rate of 10 Gb/s;]

a multiplexer configured to receive the *fixed rate* data [at a rate of 10 Gb/s from the encapsulation/recovery module] or to [received] *receive the processed* data [from a MAC device at a rate of 10 Gb/s] and selectively output *the fixed rate data or the processed* data at [a] *the fixed* rate [of 10 Gb/s] responsive to a mode selection control signal;

[a mode selection module configured to control the multiplexer based on control input from a higher layer device; and]

*wherein the media independent interface module includes* an ordered set generation and detection module [in communication with the multiplexer and the mode selection module] *implemented in one or both of circuitry and software*, the ordered set generation and detection module configured to detect ordered sets[which], *wherein the ordered sets include* (*i*) *ordered sets that* announce [a] *operational* mode [change wherein the ordered set generation and detection module is in communication with the mode selection module] *changes corresponding to changes in data rate and are communicated in-band from the MAC device to the PHY device and from the PHY device to the MAC device, and* (*ii*) *ordered sets that acknowledge the operational mode changes and are communicated in-band from the MAC device to the PHY device and from the PHY device to the MAC device.*

2. The [system] *rate adaptive interface* of claim [1] *21*, wherein the encapsulation/recovery module is further configured to recover encapsulated data thereby changing the data rate from a 10 G data rate to a 1 G data rate.

3. The [system] *rate adaptive interface* of claim [1] *21*, wherein the mode selection module adjusts the data rate of operation between [10 Mb/s,] 100 Mb/s, or 1 Gb/s.

4. The [system] *rate adaptive interface* of claim [1] *21*, wherein the encapsulation/recovery module is further configured with an input to receive data at a rate of 10 Gb/s and perform recovery thereon to output the data at a rate of 1 Gb/s.

5. A rate adaptive interface for use in a network device, the interface comprising:

[A MAC] *a media access control* (*MAC*) device configured to output *variable rate* data from a first port at a variable first rate and *fixed rate data* from a second port at a *fixed* second rate;

a [rate adaptation] *media independent interface* module, *implemented in one or both of circuitry and software, and* configured [received] *to* (*i*) *receive the variable rate* data from the MAC *device* at the variable first rate and (*ii*) convert the *variable rate* data at the variable first rate to *processed* data at [the second] *a fixed third* rate; *and* an encapsulation module configured to receive *the processed* data at the [second] *fixed third* rate from the rate adaptation module and convert the *processed* data at the [second] *fixed third* rate to *processed* data at [a third] *the fixed second* rate;

a switch configured to interface with the encapsulation module and the MAC device to receive data at [a rate of 10 Gb/s] *the fixed second rate* from either the encapsulation module or from the second port of the MAC device and output *the* data at [a rate of 10 Gb/s] *the fixed second rate*, the switch controlled by a mode selection control signal;

a mode selection module configured to provide the mode selection control signal to the switch to thereby control operation of the switch*;*

*an ordered set generation and detection module, implemented in one or both of circuitry and software, and configured to generate and detect ordered sets, wherein the ordered sets include* (*i*) *ordered sets that announce operational mode changes corresponding to changes in data rate and are communicated in-band from the MAC device to the PHY device and from the PHY device to the MAC device, and* (*ii*) *ordered sets that acknowledge the operational mode changes and are communicated in-band from the MAC device to the PHY device and from the PHY device to the MAC device.*

6. The *rate adaptive* interface of claim [5] *31*, further comprising an extension sublayer configured to receive data at a rate of 10 Gb/s from the switch, wherein the extension sublayer extends the distance which the data at a rate of 10 Gb/s may be transmitted.

7. The *rate adaptive* interface of claim [5] *31*, [further comprising an] *wherein the* ordered set generation and detection module (*i*) *is* configured *to* interface with the switch [to detect ordered sets which determine a mode change, wherein the ordered set generation and detection module] *and* (*ii*) is in communication with the mode selection module.

8. The *rate adaptive* interface of claim [5] *31*, wherein the encapsulation module is further configured to recover encapsulated data thereby changing the data rate from a 10 G data rate to a 1 G data rate.

9. The *rate adaptive* interface of claim [5] *31*, wherein data at the variable first rate comprises data at a rate of [10 Mb/s,] 100 Mb/s, or 1 Gb/s, [and] data at the [second] *third* rate comprises data at a rate of 1 Gb/s, and data at the [third] *second* rate comprises data at a rate of 10 Gb/s.

10. The *rate adaptive* interface of claim [5] *31*, wherein data at the [third] *second* rate has a format that is different than the data at the [second] *third* rate.

11. The *rate adaptive* interface of claim [5] *31*, wherein the switch comprises a multiplexer.

12. The *rate adaptive* interface of claim [5] *31*, further comprising [a] *the* PHY [Device] *device, and wherein the PHY device is* configured to receive data at a rate of 10 Gb/s from the switch.

13. The *rate adaptive* interface of claim [5] *31*, wherein the first port and the second port comprise input/output ports and the switch is configured to receive and transmit data to either of the second port of the MAC device or the encapsulation module.

14. A method for interfacing a multirate [MAC] *media access control* (*MAC*) device *in a network communication device* with a [PHY] *physical layer* (*PHY*) device in [a] *the* network communication device, the method comprising:

outputting [unprocessed] *i*) *variable rate* data from the multirate MAC device at a variable rate to a [rate adaptation] *media independent interface* module*, the media independent interface module implemented in one or both of circuitry and software,* or *ii*) *fixed rate data* at a first fixed rate to a multiplexer;

processing the data at the [rate adaptation] *media independent interface* module to up-convert the data at [a] *the* variable rate to data at a second fixed rate;

processing the data at the second fixed rate with an encapsulation module to generate processed data at the first fixed rate;

receiving, at [a] *the* multiplexer, the [unprocessed] *fixed rate* data from the MAC device at the first fixed rate or the processed data at the first fixed rate;

receiving, at the multiplexer, a mode selection signal and responsive to the mode selection signal, outputting from the multiplexer the unprocessed data at the first rate or the processed data at the first rate*;*

*detecting, with an ordered set generation and detection module of the media independent interface module, ordered sets communicated in-band from the MAC device to the PHY device and from the PHY device to the MAC device, wherein the ordered sets include* (*i*) *ordered sets that announce operational mode changes corresponding to changes in data rate, and* (*ii*) *ordered sets that acknowledge the operational mode changes.*

15. The method of claim [14] *41*, wherein the variable rate [consists of 10 Mb/s,] *is selected from a set of rates that includes* 100 Mb/s and 1 Gb/s.

16. The method of claim [14] *41*, wherein the first fixed rate comprises 10 Gb/s and the second fixed rate comprises 1 Gb/s.

17. The method of claim [14] *41*, wherein processing the data at the second fixed rate with an encapsulation module further comprise altering the format of the data.

18. The method of claim [14] *41*, further comprising outputting the data from the multiplexer to an extension sublayer, [a] *the* PHY device, or a second multiplexer.

19. The method of claim [14] *41*, wherein [up-sampling] *processing the data at the rate adaptation module* comprises padding or repeating data received at the variable rate to create data at [a] *the* second fixed rate.

20. The method of claim [14] *41*, further comprising:

establishing a mode of operation;

receiving data at the first fixed rate at the multiplexer from [a] *the* PHY device, an extension sublayer, or a second multiplexer;

responsive to the mode of operation, outputting the data at the first fixed rate to either the MAC device or to a recovery unit;

responsive to the outputting the data at the first fixed rate to a recovery unit, converting the data at the first fixed rate to the second fixed rate;

converting the data at the second fixed rate to data at a third fixed rate, wherein the data at the third fixed rate is a rate selected from a group of variable rates;

outputting the data at the third fixed rate to the MAC device.

*21. The rate adaptive interface of claim 1, wherein*

*the media independent interface module includes a rate adaptation module in communication with the MAC device,*

*the rate adaptation module is configured to receive the variable rate data at a rate selected from a set of rates* that includes 100 Mb/s and 1 Gb/s and output fixed rate data at a second fixed rate, the first fixed rate is 10 Gb/s, and the media independent interface module further comprises:

an encapsulation/recovery module configured to receive the fixed rate data at the second fixed rate from the rate adaptation module, and encapsulate the data at a rate of 1 Gb/s to generated data at a rate of 10 Gb/s, a mode selection module configured to control the multiplexer based on control input from a higher layer device;

wherein the ordered set generation and detection module is in communication with the multiplexer and the mode selection module.

22. The rate adaptive interface of claim 1, wherein the first fixed rate is 10 Gb/s.

23. The rate adaptive interface of claim 1, wherein the variable rate is selected from a set of rates that includes 10 Mb/s, 100 Mb/s, 1 Gb/s, and 10 Gb/s.

24. The rate adaptive interface of claim 1, wherein the variable rate is selected from a set of rates that includes 100 Mb/s, 1 Gb/s, and 10 Gb/s.

25. The rate adaptive interface of claim 1, wherein the media independent interface module is configured to repeat data units in the data as part of processing the data to the fixed rate.

26. The rate adaptive interface of claim 25, wherein the media independent interface module is configured to repeat octets in the data.

27. The rate adaptive interface of claim 1, wherein the media independent interface module is configured to perform idle stuffing between data units as part of processing the data to the first fixed rate.

28. The rate adaptive interface of claim 1, wherein the media independent interface module is configured to output the data at the fixed rate via a standardized interface.

29. The rate adaptive interface of claim 28, wherein the standardized interface is the 10-gigabit media independent interface (XGMII).

30. The rate adaptive interface of claim 28, wherein the media independent interface module further comprises an extension sublayer module configured to:

receive data at the first fixed rate via the standardized interface, and serialize data received via the standardized interface into one or more lanes.

31. The rate adaptive interface of claim 30, wherein the extension sublayer module is configured to serialize data received via the standardized interface into a plurality of lanes.

32. The rate adaptive interface of claim 5, wherein the media independent interface module includes:

a rate adaptation module configured to (i) receive the variable rate data from the MAC device at the variable first rate and (ii) convert the variable rate data at the variable first rate to the processed data at the fixed third rate.

33. The rate adaptive interface of claim 5, wherein the fixed third rate is 10 Gb/s.

34. The rate adaptive interface of claim 5, wherein the variable first rate is selected from a set of rates that includes 10 Mb/s, 100 Mb/s, 1 Gb/s and 10 Gb/s.

35. The rate adaptive interface of claim 5, wherein the variable first rate is selected from a set of rates that includes 100 Mb/s, 1 Gb/s and 10 Gb/s.

36. The rate adaptive interface of claim 5, wherein the media independent interface module is configured to repeat data units in the data as part of converting the data at the variable first rate to data at the second rate.

37. The rate adaptive interface of claim 36, wherein the media independent interface module is configured to repeat octets in the data.

38. The rate adaptive interface of claim 5, wherein the media independent interface module is configured to perform idle stuffing between data units as part of converting the data at the variable first rate to data at the second rate.

39. The rate adaptive interface of claim 5, wherein the media independent interface module is configured to output the data at the third fixed rate via a standardized interface.

40. The rate adaptive interface of claim 39, wherein the standardized interface is the 10-gigabit media independent interface (XGMII).

41. The rate adaptive interface of claim 39, wherein the media independent interface module further comprises an extension sublayer module configured to:

receive data at the third fixed rate via the standardized interface, and serialize data received via the standardized interface into one or more lanes.

42. The rate adaptive interface of claim 41, wherein the extension sublayer module is configured to serialize data received via the standardized interface into a plurality of lanes.

43. The method of claim 14, further comprising:

outputting unprocessed data from the multirate MAC device at the variable rate to a rate adaptation module of the media independent interface module or at the first fixed rate to a multiplexer;

processing the data at the rate adaptation module to up-convert the data at the variable rate to data at a second fixed rate;

processing the data at the second fixed rate with an encapsulation module to generate processed data at the first fixed rate;

receiving, at a multiplexer, the unprocessed data from the MAC device at the first fixed rate or the processed data at the first fixed rate;

receiving, at the multiplexer, a mode selection signal and responsive to the mode selection signal, outputting from the multiplexer the unprocessed data at the first fixed rate or the processed data at the first fixed rate.

44. The method of claim 14, wherein the first fixed rate is 10 Gb/s.

45. The method of claim 14, wherein the variable rate is selected from a set of rates that includes 10 Mb/s, 100 Mb/s, 1 Gb/s and 10 Gb/s.

46. The method of claim 14, wherein the variable rate is selected from a set of rates that includes 100 Mb/s, 1 Gb/s and 10 Gb/s.

47. The method of claim 14, wherein processing the data at the media independent interface module includes repeating data units in the data as part of up-converting the data at the variable rate to data at the first fixed rate.

48. The method of claim 47, wherein repeating data units in the data comprises repeating octets in the data.

49. The method of claim 14, wherein processing the data at the media independent interface module includes per-

*forming idle stuffing between data units as part of up-converting the data at the variable rate to data at the first fixed rate.*

*50. The method of claim 14, further comprising outputting data at the first fixed rate via a standardized interface.*

*51. The method of claim 50, wherein outputting data at the first fixed rate via the standardized interface includes outputting data at the first fixed rate via the 10-gigabit media independent interface (XGMII).*

*52. The method of claim 50, further comprising:*

*providing, via the standardized interface, data at the first fixed rate to an extension sublayer module; and*

*serializing, with the extension sublayer module, data at the first fixed rate into one or more lanes.*

*53. The method of claim 52, wherein serializing data at the first fixed rate comprises serializing data at the first fixed rate into a plurality of lanes.*

* * * * *